Figure 1:
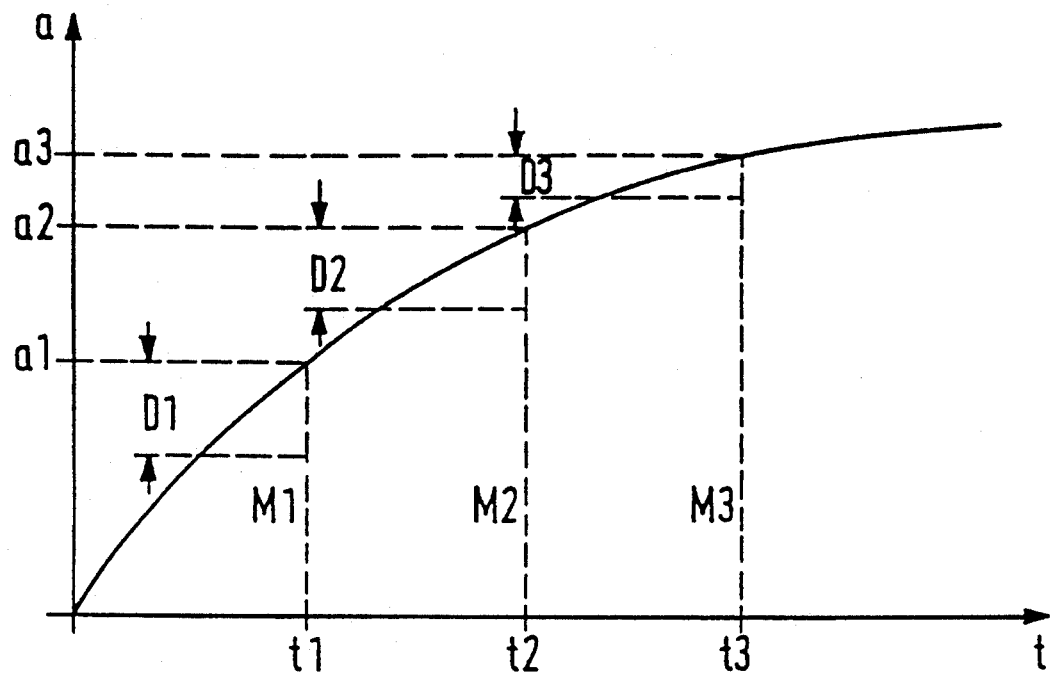

United States Patent [19]
Drobny et al.

[11] Patent Number: 5,253,173
[45] Date of Patent: Oct. 12, 1993

[54] METHOD FOR EVALUATING A SENSOR SIGNAL

[75] Inventors: Wolfgang Drobny, Besigheim; Werner Nitschke, Ditzingen; Peter Taufer, Renningen, all of Fed. Rep. of Germany

[73] Assignee: Robert Bosch GmbH, Stuttgart, Fed. Rep. of Germany

[21] Appl. No.: 690,977

[22] PCT Filed: Nov. 25, 1989

[86] PCT No.: PCT/DE89/00737
§ 371 Date: Jun. 5, 1991
§ 102(e) Date: Jun. 5, 1991

[87] PCT Pub. No.: WO90/06492
PCT Pub. Date: Jun. 14, 1990

[30] Foreign Application Priority Data
Jul. 12, 1988 [DE] Fed. Rep. of Germany ....... 3841089

[51] Int. Cl.$^5$ .............................................. B60R 21/08
[52] U.S. Cl. ................... 364/424.05; 280/735; 180/282
[58] Field of Search .............. 364/424.05; 280/735; 340/436, 438; 180/282

[56] References Cited

U.S. PATENT DOCUMENTS

| 3,976,860 | 8/1976 | Gestenmeier | 235/151.3 |
| 4,497,025 | 1/1985 | Hannoyer | 364/424.05 |
| 4,638,179 | 1/1987 | Mattes et al. | 280/735 X |
| 4,975,850 | 12/1990 | Diller | 364/424.05 |
| 4,979,763 | 12/1990 | Blackburn | 280/735 |
| 4,984,464 | 1/1991 | Thomas et al. | 73/517 R |
| 5,003,190 | 3/1991 | Seiler | 307/9.1 |
| 5,038,134 | 8/1991 | Kondo et al. | 340/438 |
| 5,068,793 | 11/1991 | Condne et al. | 364/424.05 |
| 5,073,860 | 12/1991 | Blackburn et al. | 364/424.05 |
| 5,083,276 | 1/1992 | Okano et al. | 364/424.05 |

FOREIGN PATENT DOCUMENTS

0064888 11/1982 European Pat. Off.
0327853 8/1989 European Pat. Off.
2068532A 8/1981 United Kingdom.

Primary Examiner—Thomas G. Black
Attorney, Agent, or Firm—Kenyon & Kenyon

[57] ABSTRACT

In a method for evaluating the output signal (a) from a sensor (1), an average value (M) is formulated from a plurality of successively measured values (ai) of the output signal (a). Subsequently, the difference (D) between this measured value (M) and one succeeding measured value of the output signal (a) from the sensor (1) is determined, and finally the thus formulated differential value is compared to a specified threshold value to derive a criterion for activating a restraining device for protecting motor vehicle occupants.

16 Claims, 2 Drawing Sheets

METHOD FOR EVALUATING A SENSOR SIGNAL

PRIOR ART

The invention starts out from a method for evaluating a sensor signal. The same kind of method, whereby the integrated output signal from a sensor is compared to a threshold value, is known from the literature reference 1141 *Ingenieurs de l'Automobile* (1982) no. 6, 69–77. If the output signal from the sensor exceeds the specified threshold value, then restraining devices, such as air bags and/or belt tighteners are released to protect occupants. When conventional methods are used, the disadvantage is that the sensors have to be adjusted in a very costly procedure. In addition, during the lifetime of the motor vehicle, the once effected adjustment can change again, for example due to temperature influences and/or ageing processes that the components are subject to.

ADVANTAGES OF THE INVENTION

The advantage of the method according to the invention is that one can dispense with costly adjusting operations when the sensor is manufactured and installed in a control unit. Furthermore, any variations which occur later on in the form of temperature fluctuations and/or the ageing of components cannot have an adverse effect on the process of evaluating the sensor signals.

Advantageous further developments and refinements of the method of the present invention, and suitable devices for implementing the method will become apparent in view of the following detailed description and drawings.

DRAWINGS

Exemplified embodiments of the invention are depicted in the drawings and clarified in greater detail in the following description.

Figure 2:
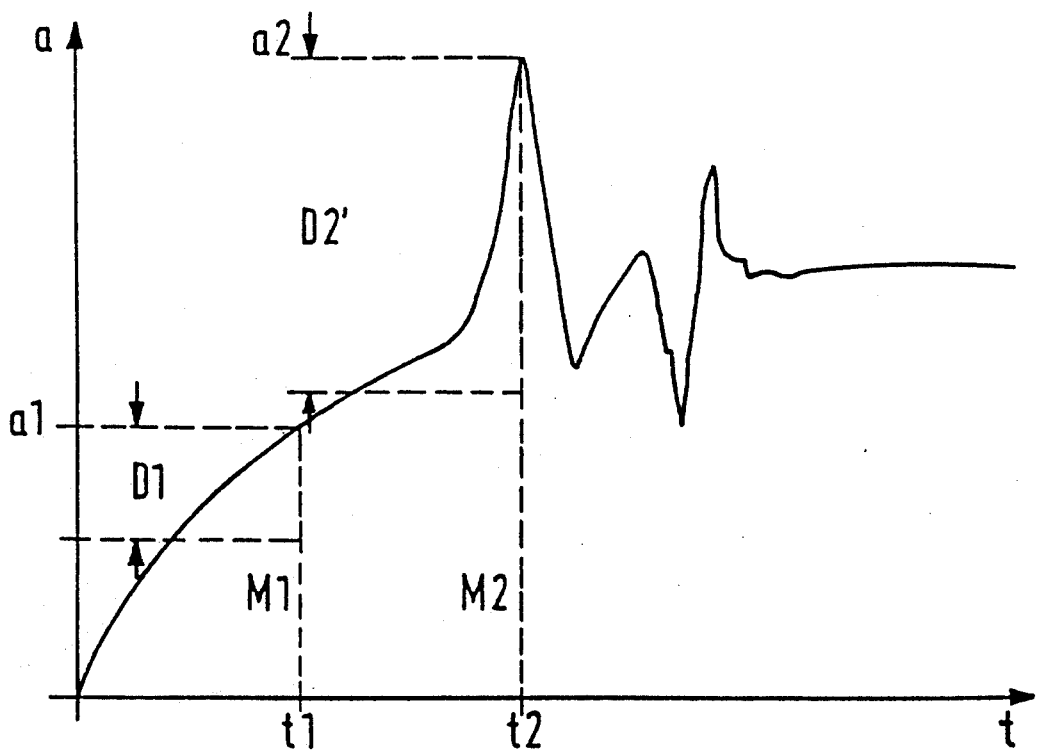
Figure 3:
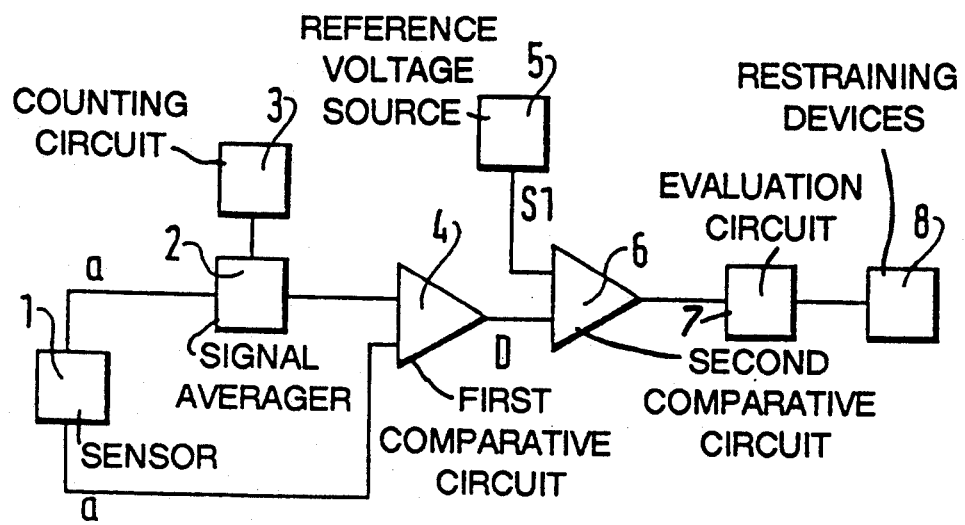
Figure 4:
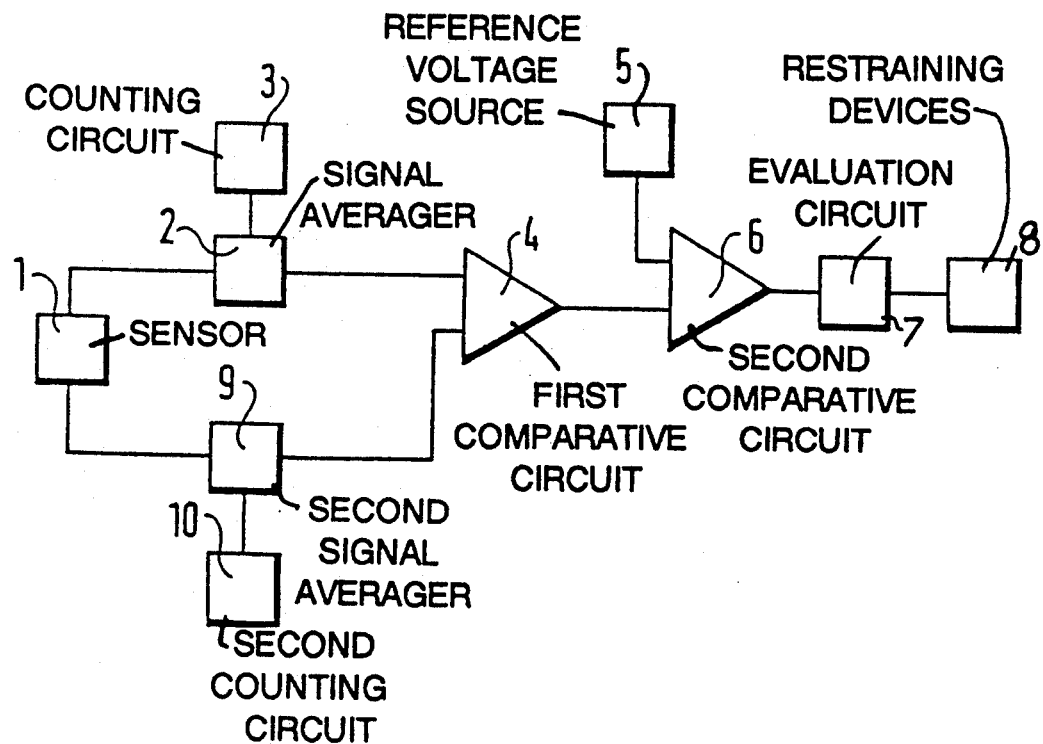

FIG. 1 depicts a first diagram representing a sensor signal as a function of time;

FIG. 2 a second diagram representing a sensor signal as a function of time;

FIG. 3 a block diagram of a first exemplified embodiment of a device for implementing the method according to the invention; and FIG. 4 a block diagram of a second device.

DESCRIPTION OF THE EXEMPLIFIED EMBODIMENTS

In accordance with a first exemplified embodiment of FIG. 3, a device for implementing the method according to the invention comprises a sensor 1 having several outputs for its output signal. A first output of the sensor 1 is connected to the input terminal of a signal averager 2, whose output terminal is connected to the first input terminal of a first comparative circuit 4. A second output of the sensor 1 is directly connected to a second input terminal of the first comparative circuit 4. Also, a counting circuit 3 is connected to the signal averager 2. The output terminal of the first comparative circuit 4 is connected to a first input terminal of a second comparative circuit 6. A second input terminal of the second comparative circuit 6 is connected to the input terminal of a reference voltage source 5. The output terminal of the second comparative circuit 6 is connected to the input of an evaluation circuit 7, whose output is connected on its part to the input terminal of restraining devices 8.

In FIG. 4, a second exemplified embodiment of a device for implementing the method according to the invention differs still from the exemplified embodiment depicted in FIG. 3 in that the second output of sensor 1 is also not directly connected to an input terminal of a first comparative circuit 4, but rather to the input terminal of a second signal averager 9, whose output terminal is connected to the second input terminal of the first comparative circuit. In addition, a second counting circuit 10 is connected to the second signal averager 9.

The method according to the invention shall be clarified in the following, also with reference to the diagrams depicted in FIG. 1 and FIG. 2. In an idealized representation, FIG. 1 shows the output signal a from the sensor 1 as a function of time t. The sensor 1 is preferably an acceleration-sensitive sensor, for example a piezoelectric crystal, which emits an output signal that is proportional to the acceleration of the motor vehicle. To formulate an average value M from the output signal of sensor 1 by means of the first signal averager 2, according to the following formula $$M = \frac{1}{n} \sum_{i=1}^{n} ai \quad (1)$$

at specifiable time intervals Ti, n measured values ai, whereby i=1−n, are tapped off, added up, and divided by the number of measured values. By means of the counting circuit 3 controlling the first signal averager 2, the number of measured values ai to be tapped off can thereby be specified. The average value M formulated in the first signal averager 2 from the individual measured values ai is then fed to a first input terminal of a first comparative circuit 4, whose second input terminal is directly connected to an output of sensor 1. According to the following formula $$D = |an - M| \quad (2)$$

a differential signal D is formed in the first comparative circuit 4. This differential signal D is fed from the output terminal of the first comparative circuit 4 to a first input terminal of a second comparative circuit 6. A reference voltage value from a reference voltage source 5 is directed to a second input terminal of the second comparative circuit 6. In this second comparative circuit 6, the differential signal D is compared to a specified threshold value S1 (according to the following inequality (3))

$$D \leq S1? \quad (3)$$

As long as the comparison shows that the differential signal D lies below the specified threshold S1, the average value M is assumed as an updated average value MA. However, if the comparison shows that the value of the differential signal D is greater than the specified threshold value S1, then the preceding value M is assumed as an updated average value MA. It follows from the representation according to FIG. 1 that the measured values a1, a2, a3 of the output signal from sensor 1 are tapped off at successive instants t1, t2, t3. On the one hand, these measured values a1, a2, a3 are each fed to the signal averager 2 and, on the other hand, directly to the first comparative circuit 4. In the first comparative circuit 4, the measured values a1, a2, a3 are compared to the updated average values M1, M2, M3, and the difference D1, D2, D3 is formed. When the difference between the average value M1 and the measured value a1, which is acquired at the instant T1, is formed, a comparatively large differential signal value is revealed. According to the comparison in the second comparative stage 6, thus when compared to the specified threshold value S1, this differential signal value exceeds the threshold value S1. Accordingly, the average value M1 is not considered, but an average value M that had been acquired beforehand is retained as an average value M. The same applies to the depicted differential value D2. Only the differential value D3 lies below the specified threshold value S1 and, accordingly, one continues with M3 as an updated average value MA.

It is useful to formulate the average values M from a number of measured values ai of the sensor signal a, which correspond to a power of 2; preferably the number lies within the limits from 100 to about 300, in particular, about 256 measured values.

Compared to the idealized representation of FIG. 1, the diagram according to FIG. 2 shows a more realistic representation of the curve shape of the output signal from sensor 1. One can recognize relatively strong amplitude fluctuations around an imaginary center line of the idealized curve shape. As depicted at the instant t2, when a measured value a2 is acquired after the specified time cycle exactly at the point of an extreme amplitude climb, this measured value deviates drastically from a measured value ai acquired earlier or later on, and can considerably corrupt the expected result during the further processing of the signal. To suppress this disadvantageous effect of amplitude fluctuations, in a further exemplified embodiment of the method according to the invention, in order to acquire the differential signal D, the average value M is compared not only to a single measured value of the output signal a from the sensor 1, but rather to an average value of several measured values of this output signal.

For that, a number of measured values of the output signal a from the sensor 1 is effectively processed, corresponding to a power of 2. In particular 4 to 16, and preferably 8 measured values of the sensor signal a are combined to form an average value. This second average-value formation is implemented by a device according to FIG. 4, in that the output signal a from the sensor 1 is also fed to a second signal averager 9. This second signal averager 9 is controlled by a counting unit 10, which specifies the number of measured values to be processed to form the average value.

In a further advantageous refinement of the invention, the output signal a from the sensor 1 is initially integrated slowly, that is, over a relatively long period of time T1. The acquired integrated measured value I1 is then compared to the output signal a from the sensor 1. The acquired differential value D1, in turn, is compared to a specifiable threshold value S1. If the differential value D1 is greater than the threshold value S1, the output signal a from the sensor 1 is not retrieved for further integration. At the same time, the output signal a from the sensor 1 is integrated briefly, that is over a comparatively short period of time T2, and a floating average-value formation is carried out (integrated measured value I2). The integrated measured values I1, I2 are subsequently compared to one another. The differential value D3 resulting from this comparison is compared to a specifiable threshold value S3. If the differential value D3 exceeds the threshold value S3, then the passenger restraining system is released.

We claim:

1. An apparatus for controlling a passenger restraint device in a motor vehicle, comprising:
   a sensor for generating output signals indicative of the acceleration of the motor vehicle;
   first means coupled to the sensor for generating first averaging signals indicative of the average value of a first predetermined number of successively measured output signals of the sensor;
   second means coupled to the first means and to the sensor for comparing the sensor output signals to the first averaging signals and generating first differential signals indicative of the difference between the sensor output signals and first averaging signals;
   third means coupled to the second means for comparing the first differential signals to a threshold signal value, and if a first differential signal is less than the threshold signal value, the corresponding first averaging signal is set as an updated first averaging signal to be generated by the first means; and
   an evaluation circuit coupled to the third means and responsive to the first differential signals for controlling the release of the passenger restraint device based thereon.

2. An apparatus as defined in claim 1, further comprising fourth means coupled between the sensor and the second means for generating second averaging signals indicative of the average value of a second predetermined number of successively measured output signals of the sensor, wherein the second predetermined number is less than the first predetermined number, and wherein the second means compares the first averaging signals to the second averaging signals and the first differential signals are indicative of the difference between the first and second averaging signals.

3. An apparatus as defined in claim 2, wherein the first and second predetermined numbers correspond to a power of 2.

4. An apparatus as defined in claim 2, wherein the first predetermined number is approximately 256 and the second predetermined number is approximately 8.

5. An apparatus as defined in claim 2, wherein the second predetermined number is within the range of approximately 4 to 16.

6. An apparatus as defined in claim 1, further comprising a reference voltage source coupled to the third means, wherein the threshold signal value is based on a reference voltage signal transmitted by the reference voltage source to the third means.

7. An apparatus as defined in claim 1, wherein the first predetermined number is within the range of approximately 100 to 300.

8. An apparatus for evaluating acceleration signals generated by an acceleration sensor mounted on a motor vehicle, wherein the release of at least one passenger restraint device is controlled based on the acceleration signals, comprising:
   a first averaging unit coupled to the sensor for generating first averaging signals indicative of the average value of a first predetermined number of successively measured acceleration signals;
   a first comparator unit coupled to the first averaging unit and to the sensor for comparing the acceleration signals to corresponding first averaging signals and generating first differential signals indicative of the difference between the acceleration signals and the first averaging signals; and a second comparator unit coupled between an output of the first comparator unit for comparing the first differential signals to a threshold signal value and an evaluating unit for controlling the release of the at least one passenger restraint device, wherein the second comparator unit generates second differential signals indicative of the difference between the corresponding first differential signals and the threshold signal value, whereupon if a first differential signal is less than the threshold signal value, the corresponding first averaging signal is set as an updated first averaging signal to be generated by the first averaging unit, and wherein the second differential signals are transmitted to the evaluating unit for controlling the release of the passenger restraint device based thereon.

9. An apparatus as defined in claim 8, further comprising:

a second averaging unit coupled between the sensor and the first comparator unit for transmitting second averaging signals indicative of the average value of a second predetermined number of successively measured acceleration signals to the first comparator unit, wherein the first comparator unit compares the first averaging signals to the second averaging signals and the first differential signals are indicative of the difference between the first and second averaging signals.

10. An apparatus as defined in claim 9, wherein the first predetermined number is within the range of approximately 100 to 300, and the second predetermined number is within the range of approximately 4 to 16.

11. A method for controlling a passenger restraint device in a motor vehicle comprising the following steps:

generating acceleration signals indicative of the acceleration of the motor vehicle;

generating first averaging signals indicative of the average value of a first predetermined number of successive acceleration signals;

comparing the first averaging signals to corresponding acceleration signals and generating first differential signals indicative of the difference between the first averaging signals and the corresponding acceleration signals; and comparing the first differential signals to a threshold signal value, and if a first differential signal is less than the threshold signal value, setting the corresponding first averaging signal as an updated first averaging signal to be generated; and transmitting a second differential signal indicative of the difference between the first differential signal and the threshold signal value to an evaluation unit, which is in turn coupled to the passenger restraint device for controlling the release of the passenger restraint device based on the second differential signal.

12. A method as defined in claim 11, further comprising the steps of:

generating second averaging signals indicative of the average value of a second predetermined number of successive acceleration signals, wherein the second predetermined number is less than the first predetermined number;

comparing the second averaging signals to the first averaging signals, wherein the first differential signals are indicative of the difference between the first averaging signals and corresponding second averaging signals.

13. A method as defined in claim 12, wherein the first and second predetermined numbers correspond to the power of 2.

14. A method as defined in claim 12, wherein the first predetermined number is within the range of approximately 100 to 300, and the second predetermined number is within the range of approximately 4 to 16.

15. A method as defined in claim 12, wherein the first predetermined number is approximately 256 and the second predetermined number is approximately 8.

16. A method for evaluating sensor signals in connection with releasing a passenger restraint device in a motor vehicle, wherein the sensor signals are indicative of the acceleration of the motor vehicle, comprising the following steps:

integrating the sensor signals during a first time interval and generating a first integrated signal based thereon;

comparing the first integrated signals to corresponding sensor signals and generating first differential signals indicative of the difference between the integrated signal values and the corresponding sensor signal values;

comparing the first differential signal values to a first threshold signal value;

simultaneously integrating the sensor signals during a second time interval shorter in duration than the first time interval and generating a second integrated signal based thereon;

comparing the first integrated signals to corresponding second integrated signals and generating a second differential signal indicative of the difference between the corresponding first and second integrated signals; and comparing the second differential signals to a second threshold value, and releasing the passenger restraint device if a second differential signal exceeds the second threshold signal value.

* * * * *